United States Patent [19]

Lupke

[11] Patent Number: 4,770,618
[45] Date of Patent: Sep. 13, 1988

[54] EXTRUSION DIE FOR TWO-PLY PLASTIC TUBING

[76] Inventor: Manfred A. A. Lupke, 92 Elgin St., Thornhill, Ontario, Canada, L3T 1W6

[21] Appl. No.: 818,957

[22] Filed: Jan. 15, 1986

[51] Int. Cl.$^4$ .............................................. B29C 47/06
[52] U.S. Cl. ............................ 425/72.1; 425/133.1; 425/224; 425/326.1; 425/378 R; 425/369; 425/387.1; 425/388; 425/392; 425/393; 425/3; 425/529; 425/532
[58] Field of Search ............... 425/133.1, 466, 72 R, 425/133.1, 224, 233, 326.1, 377, 378 R, 387.1, 385, 388, 392, 393, 395, 396, 400, 405 R, 451, 456, 504, 505, 516, 369, 320, 394, 342.1, 529, 532, 535, 503, 464, 370 R, 405.1, 72.1, 471

[56] References Cited

U.S. PATENT DOCUMENTS

| | | | |
|---|---|---|---|
| 2,957,201 | 10/1960 | Fields et al. | 425/190 |
| 3,677,676 | 7/1972 | Hegler | 425/133.1 |
| 3,856,448 | 12/1974 | Iijima et al. | 425/133.1 |
| 3,981,663 | 9/1976 | Lupke | 425/326.1 |
| 3,994,644 | 11/1976 | Hegler et al. | 425/133.1 |
| 3,994,646 | 11/1976 | Hauck | 425/133.1 |
| 4,226,580 | 10/1980 | Lupke et al. | 425/131.1 |
| 4,305,703 | 12/1981 | Lupke et al. | 425/72 R |
| 4,500,284 | 2/1985 | Lupke | 425/133.1 |
| 4,507,071 | 3/1985 | Hahn et al. | 425/133.1 |
| 4,510,013 | 4/1985 | Lupke et al. | 425/378 R |
| 4,545,751 | 10/1985 | Lupke | 425/72 R |

Primary Examiner—Willard E. Hoag

[57] ABSTRACT

An extrusion die for two-ply seamless plastic tubing, includes an extrusion head with a first nozzle provided with a first centering means; a first hollow mandrel placed within said nozzle; an elongate carrier bearing a second mandrel, a second nozzle and a spider in turn supporting a distributor splitting an extrudate. The first nozzle and the distributor define a first annular extrusion orifice for an outer parison of the tubing while the second nozzle and the second mandrel define a second annular extrusion orifice for the inner parison of the tubing. A threaded member longitudinally adjusts said carrier to vary the size of the first extrusion orifice. A coupling means interconnects the carrier and the first mandrel and allows only the axial, without rotation, movement of the carrier. A second centering means mounts the distributor uniformly spaced around the spider.

8 Claims, 2 Drawing Sheets

EXTRUSION DIE FOR TWO-PLY PLASTIC TUBING

BACKGROUND OF THE INVENTION

This invention relates to extrusion dies for an apparatus producing seamless plastic tubing, particularly, double-walled pipes with a smooth inner wall and a corrugated outer wall.

Known dies of such a type (for example, U.S. Pat. Nos. 4,305,703 and 4,510,013) include: an extrusion head with a first nozzle; a first hollow mandrel placed within said nozzle; an elongate carrier bearing a second mandrel and a second nozzle, said mandrels and nozzles defining annular extrusion orifices forming accordingly an outer and inner parisons of the tubing.

These dies do not allow to vary the wall thickness of the tubing and to center the extrusion orifices.

Another known die for two-ply tubing (West German patent document No. 29 11 833) comprises: an extrusion head with a nozzle and a first hollow mandrel; and elongate distributor placed within the mandrel, shaped as an upstreamly tapered ring splitting the extrudate to produce two-ply seamless tubing and defining with the nozzle and mandrel annular extrusion orifices forming respectively the outer and inner parisons of the tubing.

This die has the same disadvantages as the first two dies.

Finally, it is known a die (U.S. Pat. No. 2,957,201) comprising: an extrusion head with a nozzle, its centering means, a hollow mandrel, a threaded member adjusting longitudinally the mandrel to vary the size of an extrusion orifice, and a distributor splitting the extrudate and defining with the nozzle and mandrel annular extrusion orifices forming accordingly the outer and inner parisons of the tubing.

This die allows to control the thickness of the inner wall and to center both the extrusion orifices. However, it has the following disadvantages: the outer wall thickness is not controlled, and the parison can be twisted along with the moved mandrel during the inner wall thickness adjustment.

SUMMARY OF THE INVENTION

The objective of the present invention is to overcome the above disadvantages of the known dies.

This objective is achieved by means of that the die is supplied with the following components:

an elongate carrier placed within the mandrel and carrying a second mandrel and a spider which constitutes an inner ring disposed on the carrier and an outer ring attached to the inner ring by means of spider legs and has an upstream distributor and a downstream nozzle, the distributor being shaped as a ring tapered upstream and splitting the extrudate to produce two-ply seamless tubing, the first nozzle and distributor and the second nozzle and mandrel defining respectively the first and second annular extrusion orifices of diminishing interior dimensions, through which the extrudate can flow uninterruptedly and form accordingly an outer and inner parisons of the two-ply tubing within the nozzles and around the mandrels;

a coupling means, such as a key, spline and the like, interconnecting said carrier and the first mandrel and allowing only the axial, without rotation, movement of the carrier;

a second centering means mounting said distributor uniformly spaced around the spider by means of screws disposed in said distributor radially, interacting with the lateral surface of the spider and permitting the radial adjustment of said distributor with respect to the spider.

Also, such a design allows easy replacement of the nozzles and mandrels for cleaning and for different sizes of the produced tubing.

To render justice, it should be mentioned that, in contrast to the die of the latter U.S. patent, the control of the inner tube in the present die interrupts the production of the pipe.

A more complete appreciation of the present invention and the distinguishing characteristics, objectives and attendant advantages thereof set out herein are more apparent and obvious to one ordinary skilled in the art from the following detailed description, drawings and appended claims.

DESCRIPTION OF THE PREFERRED EMBODIMENT

Figure 1:
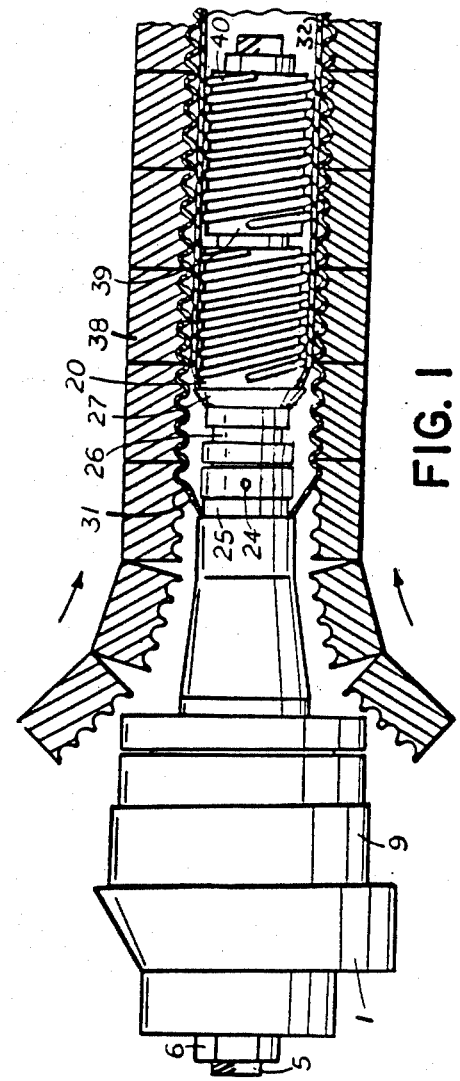
FIG. 1 is a sectional elevation of the apparatus of the present invention used in the production of double-walled thermoplastic pipe with a smooth inner wall and a corrugated outer wall.

Referring now to the drawings, the extrusion die of the present invention for an apparatus producing two-ply seamless plastic tubing includes an extrusion head 1, a first elongate nozzle 2, a first hollow mandrel 3, two centering means, an elongate hollow carrier 5, a threaded adjusting member 6 and a coupling means.

The extrusion head 1 has a central bore with a lateral opening 8 for fluid communication with an annular (not shown) and for receiving an extrudate of a thermoplastic material under pressure therefrom. The head 1 is provided with a heater 9 and thermal sensors (not shown).

The nozzle 2 has a flange 10 in its receiving end for clamping the nozzle to the head 1. This is achieved by means of a ring 11 with screws 12 disposed circumferentially around the flange 10. The nozzle 2 provides a supply passage extending in the longitudinal direction of the nozzle and adapted for the delivery of the extrudate to two extrusion orifices forming the plies of the produced double-walled pipe.

The mandrel 3 is placed in said central bore in substantially coaxial relation with the nozzle 2 and is spaced from the latter. The lateral surface of the mandrel has curved slots 13 to which the opening 8 is tangential to provide a gradual transition to a plastic conducting passage extending in the longitudinal direction of the die for the delivery of the extrudate to the extrusion orifices. A free end of the mandrel 3 has a flange 14 which is fastened to the head 1 with screws 15 circumferentially spaced around the mandrel.

The first centering means mounts the first nozzle 2 uniformly spaced around the first mandrel 3 and has centering screws 16 disposed radially in the head 1. The screws 16 interact with the lateral surface of the flange 10 of the nozzle 2. This permits the radial adjustment of the same with respect to the mandrel 3.

The carrier 5 is placed within the first mandrel 3 and carries a spider fixed to the carrier by means of a key 18 and a threaded tube 19 carrying a second mandrel 20. The spider constitutes an inner ring 21 disposed on the carrier 5 and an outer ring 22 attached to the ring 21 by means of double-edged radial spider legs 23. The latter have passages 24 to supply air from a compressor (in a blow-molding process) or from the atmosphere (in a vacuum-molding process) into the space under the formed outer parison. This air line is placed within the carrier 5 (not shown). The spider bears an upstream distributor 25 and a housing 26 in which a downstream second nozzle 27 is screwed in. The housing 26 is fixed by means of fasteners 28 to the distributor 25. The latter is shaped as a ring tapered upstream and splitting the extrudate to produce the two-ply seamless tubing.

The first nozzle 2 and distributor 25 and the second nozzle 27 and mandrel 20 define respectively the first 29 and second 30 annular extrusion orifices of diminishing interior dimensions. Through the orifices 29 and 30 the extrudate can flow uninterruptedly and form accordingly an outer 31 and inner 32 parisons of the produced two-ply tubing within the nozzles 2 and 27 and around the distributor 25 and the mandrel 20.

The threaded member 6 is represented by a nut and adjusts the carrier 5 longitudinally, which is effective to vary the size of the first extrusion orifice 29 when the carrier is axially displaced by rotating the nut on the free threaded end of the carrier 5. The nut is held in place by means of its flange 33 and a cap 34 fixed to the flange 14 with circumferentially disposed screws 35. Such a structure allows the rotation of the nut within its axial displacement.

The coupling means is represented by a key 36, interconnects the carrier 5 and the first mandrel 3 and allows only the axial, without rotation, movement of the carrier 5.

Figures 2, 3, 4:
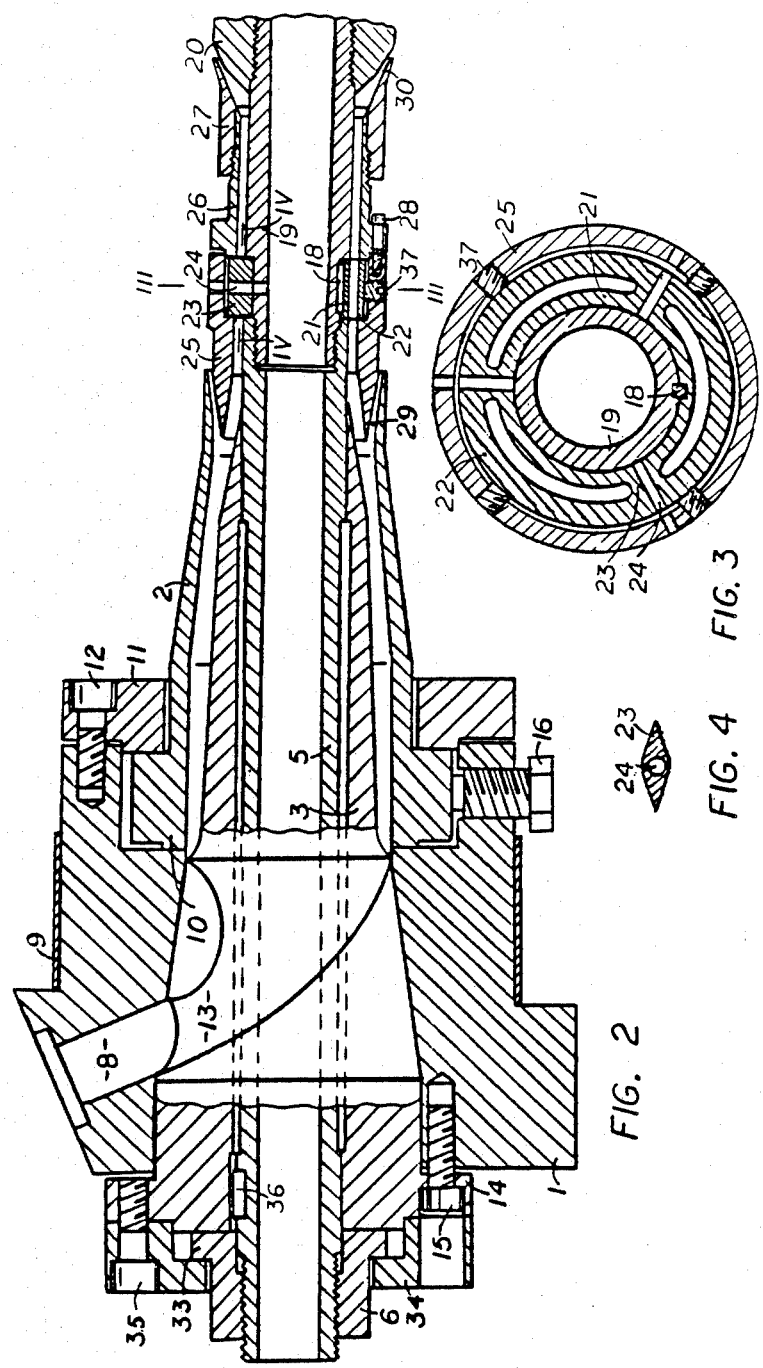
FIG. 2 is a longitudinal section of the present die.
FIG. 3 is a cross-sectional elevation taken along line III—III of FIG. 2.
FIG. 4 is a longitudinal sectional elevation taken along line IV—IV of FIG. 2.

The second centering means mounts the distributor 25 uniformly spaced around the spider by means of screws 37 radially disposed in the distributor 25 (in FIG. 2 the screw 37 is conditionally shown in the plane of the drawing). The screws 37 interact with the lateral surface of the ring 22 and permit the radial adjustment of the distributor 25 with respect to the spider.

As already mentioned, the particular embodiment of this invention is adapted for the production of corrugated tubing, for which a tubular mold cavity is formed by a series of forwardly moving molds 38 described, for example, in the mentioned U.S. Pat. No. 4,510,013.

For the internal cooling of the formed pipe, one or more cooling plugs 39 are attached downstream of the die. The plug 39 constitutes a tubing in which a coil 40 of a pipe for cooling fluid is embedded. The lines for said fluid are placed within the carrier 5 (not shown). Such a cooling is more fully described in said U.S. Pat. No. 4,510,013.

It is clearly undertood that a person skilled in the art could apply the same structure with different options, for example, blow molding, vacuum molding and their combination can be used. Also, instead of the plugs 39, internal cooling with a vortex cooler and a bullet (U.S. Pat. No. 4,545,751) or conventional air flow restrictors (such as baffles of U.S. Pat. No. 3,981,663) can be applied, etc.

In operation, an extrudate of an expandable plastic materials flows from the extruder uninterruptedly through the passage between the nozzle 2 and the mandrel 3 to the distributor 25. The latter splits the plastic into an outer stream forming the outer ply 31 in the orifice 29 and into an inner stream flowing through the spider around its legs 23 to form the inner ply 32 in the orifice 30.

In the blow molding mode, pressurized air is introduced through the passage 24 to the interior of the formed parison 31 which conforms to the wall of the tubular mold cavity under the air pressure.

In the vacuum molding mode, the molds 38 are provided with channels (not shown) connected to a vacuum pump. The pressure in said interior can be atmospheric or from an air pressure supply (the combination molding).

While there has been described and pointed out the fundamental novel feature of the invention as applied to the preferred embodiment, it is to be understood that this description is exemplary and explanatory, but not restrictive, the invention being not limited to the specific details shown and described. Various departures, omissions, substitutions and changes may be made by the skilled in the art without departing from the scope of the invention and without sacrificing its chief advantages. Obviously, many modifications and variations of the present invention are possible in light of the above teaching. It is therefore to be understood that within the scope of the appended claims, the present invention may be practiced otherwise than as specifically described herein.

What is claimed is:

1. An extrusion die for an apparatus for producing two-ply seamless plastic tubing with the plies being of the same material, the die including:
   an extrusion head defining a central bore and having only one inlet opening for receiving an extrudate of a thermoplastic material under pressure therein;
   a first elongated nozzle attached to said head and providing a supply passage extending in the longitudinal direction thereof for the delivery of said extrudate to the delivery end thereof;
   a first hollow mandrel disposed in said bore in substantially coaxial relation with said first nozzle and spaced from the latter to provide a plastic-conducting passage extending in the longitudinal direction thereof for the delivery of said extrudate to the delivery end thereof;
   an elongated carrier disposed within the first mandrel and extending longitudinally therefrom;
   a second mandrel carried by said elongated carrier and axially spaced from said first mandrel;
   an annular distributor carried by said elongated carrier, tapering in radial thickness in the axial upstream direction and positioned in an annular flow channel for material to be extruded and between said first nozzle and said first mandrel;
   a second nozzle carried by said distributor and disposed axially downstream from said first nozzle;
   said first nozzle and said distributor and said second nozzle and said second mandrel defining respectively first and second annular passages having interior radial dimensions decreasing in the downstream axial direction and terminating in first and second extrusion orifices respectively through which the extrudate can flow uninterruptedly so to form outer and inner parisons respectively of said two-ply tubing; and a threaded adjusting member operatively associated with said elongated carrier to adjust the longitudinal position of said carrier thereby in turn to vary the size of said first extrusion orifice when the carrier is axially adjusted, said carrier and said first mandrel being interconnected such as to allow only relative axial movement therebetween without relative rotation therebetween.

2. An extrusion die for an apparatus for producing two-ply seamless plastic tubing with the plies being of the same material, the die including:
- an extrusion head having a central bore with only one inlet opening for receiving an extrudate of a thermoplastic material under pressure therein:
- a first elongated nozzle attached to said head and providing a supply passage extending in the longitudinal direction thereof for the delivery of said extrudate to the delivery end thereof;
- a first hollow mandrel disposed in said bore in substantially coaxial relation with said first nozzle and spaced from the latter to provide a plastic-conducting passage extending in the longitudinal direction thereof for the delivery of said extrudate to the delivery end thereof;
- an elongate carrier disposed within the first mandrel and extending longitudinally therefrom;
- a spider having inner and outer rings attached to each other by means of spider legs, said inner ring being supported by said elongated carrier;
- an annular distributor carried by said outer ring of said spider, tapering in radial thickness in the axial upstream direction and positioned in a first annular flow channel within the first nozzle for material to be extruded to divide such material into two separate streams to form respectively inner and outer parisons of the two-ply seamless tubing;
- a second mandrel carried by said elongated carrier and axially spaced from said first mandrel;
- a second nozzle carried by said outer ring of said spider and disposed axially downstream from said first nozzle,
- said first nozzle and said distributor defining a first annular passage having interior radial dimensions decreasing in the downstream axial direction and terminating in a first annular orifice through which the extrudate can flow uninterruptedly to form the outer parison of said two-ply tubing within the first nozzle;
- said second nozzle and said second mandrel defining a second annular flow passage having interior radial dimensions decreasing in the downstream axial direction and terminating in a second annular orifice through which the extrudate can flow uninterruptedly to form the inner parison of said two-ply tubing within the second nozzle and around the second mandrel.

3. The die of claim 2 wherein said carrier has a threaded adjusting member operatively associated therewith for adjusting the longitudinal position of said carrier to vary the size of said first extrusion orifice when the carrier is axially adjusted.

4. The die of claim 3 wherein said carrier and said first mandrel are movably interconnected so as to allow only axial movement therebetween without relative rotation.

5. The die of claim 2 wherein it further includes a centering means mounting said distributor around the spider by means of screws disposed radially in said distributor, said screws interacting with a lateral surface of the spider and permitting radial adjustment of said distributor with respect to the spider 6. An extrusion die for an apparatus for producing two-ply seamless plastic tubing with the plies being of the same material, the die including:
- an extrusion head having a central bore with only one inlet opening for receiving an extrudate of a thermoplastic material under pressure therein, said opening being lateral relative to said bore;
- a first elongated nozzle attached to said head and providing a supply passage extending in the longitudinal direction thereof for the delivery of said extrudate to the delivery end thereof;
- a first hollow mandrel disposed in said bore in substantially coaxial relation with said first nozzle and spaced from the latter to provide a plastic-conducting passage extending in the longitudinal direction thereof for the delivery of said extrudate to the delivery end thereof;
- a first centering means mounting said first nozzle around the first mandrel and having screws disposed radially in said head, interacting with a lateral surface of the first nozzle and permitting radial adjustment of the first nozzle with respect to said first mandrel;
- an elongated carrier disposed within the first mandrel and extending longitudinally therefrom;
- a second mandrel carried by said elongated carrier and axially spaced from said first mandrel
- a spider comprising an inner ring supported by said carrier and an outer ring attached to the inner ring by means of spider legs;
- an annular distributor carried by said outer ring of said spider, tapering in radial thickness in the axial upstream direction and positioned in a first annular flow channel within the first nozzle for material to be extruded to divide such material into two separate streams;
- a second nozzle carried by said outer ring of said spider and disposed axially downstream from said first nozzle;
- said first nozzle and said distributor and said second nozzle and said second mandrel defining respectively first and second annular flow passages having interior radial dimensions decreasing in the downstream axial direction, and terminating in first and second annular orifices through which the extrudate can flow uninterruptedly to form outer and inner parisons respectively of said two ply tubing;
- a threaded adjusting member operatively associated with said elongated carrier to adjust the longitudinal position of said carrier thereby in turn to vary the size of said first extrusion orifice when the carrier is axially adjusted; and
- a second centering means mounting said distributor around the spider by means of screws disposed radially in said distributor, said screws interacting with a lateral surface of the spider and permitting radial adjustment of said distributor with respect to the spider, said carrier and said first mandrel being interconnected such as to allow only relative axial movement therebetween without relative rotation therebetween.

7. An extrusion die as claimed in claim 1 and which additionally comprises a centering means mounting said first nozzle around said first mandrel and having screws disposed radially in said head, said screws interacting with a lateral surface of said first nozzle and permitting radial adjustment of said first nozzle with respect to said first mandrel.

8. An extrusion die as claimed in claim 2 and which additionally comprises a centering means mounting said first nozzle around said first mandrel and having screws disposed radially in said head, said screws interacting with a lateral surface of said first nozzle and permitting radial adjustment of said first nozzle with respect to said first mandrel.

* * * * *